United States Patent
Juretzka et al.

(10) Patent No.: US 6,439,211 B1
(45) Date of Patent: Aug. 27, 2002

(54) FOUR-STROKE INTERNAL COMBUSTION ENGINE WITH COMPRESSION IGNITION AND INTERNAL EXHAUST GAS RECIRCULATION

(75) Inventors: Andreas Juretzka, Hude; Klaus Rössler, Altbach; Guido Vent, Oppenweiler, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/696,343

(22) Filed: Oct. 24, 2000

(30) Foreign Application Priority Data

Oct. 29, 1999 (DE) .......................................... 199 52 093

(51) Int. Cl.[7] .............................................. F02M 25/07
(52) U.S. Cl. .................. 123/568.14; 123/90.15
(58) Field of Search ..................... 123/90.15, 90.16, 123/316, 568.11, 568.14

(56) References Cited

U.S. PATENT DOCUMENTS

| | | | | |
|---|---|---|---|---|
| 1,501,041 A | * | 7/1924 | Cutler | 123/90.16 |
| 1,610,888 A | * | 12/1926 | Sauer | 123/316 |
| 4,700,684 A | * | 10/1987 | Pischinger | 123/568.14 |
| 5,927,238 A | * | 7/1999 | Watson | 123/568.14 |
| 5,960,755 A | * | 10/1999 | Diggs et al. | 123/568.14 |
| 6,125,828 A | * | 10/2000 | Hu | 123/568.14 |
| 6,257,213 B1 | * | 7/2001 | Maeda | 123/568.14 |

OTHER PUBLICATIONS

1998 Society of Automative Engineer's, Inc. (SAE) paper, authored by Rolf–Günther Nieberding, entitled "The Knocking Syndrome—Its Cure and Its Potential" (8 sheets total).

* cited by examiner

*Primary Examiner*—Willis R. Wolfe
(74) *Attorney, Agent, or Firm*—Klaus J. Bach

(57) ABSTRACT

The invention relates to a four-stroke internal combustion engine with compression ignition and internal exhaust gas recirulation by appropriate actuation of inlet and exhaust valves of at least one cylinder/piston unit. The invention provides for at least one inlet valve and at least one exhaust valve of the cylinder/piston unit to be actuable in such a way that the exhaust valve opening takes place before a charge-exchange top dead center position of a piston between an exhaust stroke and an intake stroke, and the exhaust valve closing takes place after this charge-exchange top dead center position at essentially the same time as the inlet valve opens, in order to displace exhaust gas from a combustion space of the cylinder/piston unit through the open exhaust valve into an exhaust duct and subsequently to suck it back from the exhaust duct into the combustion space.

8 Claims, 2 Drawing Sheets

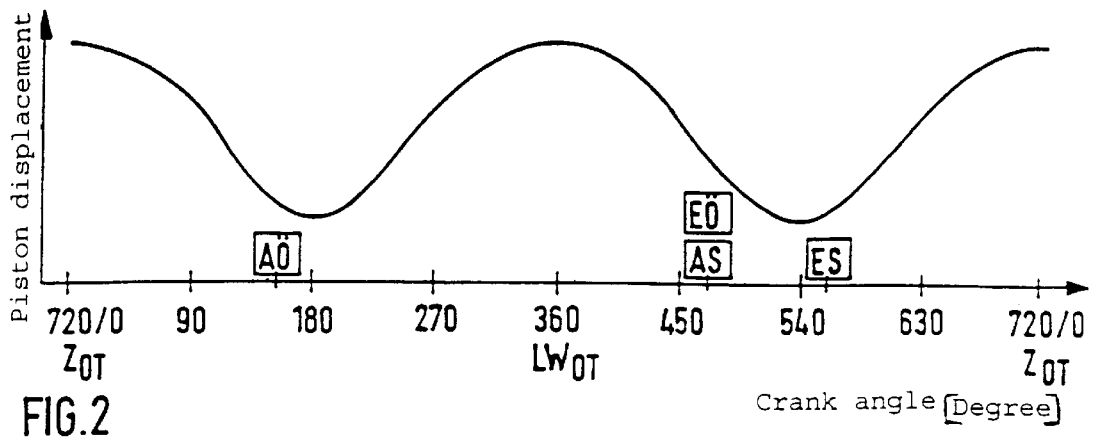
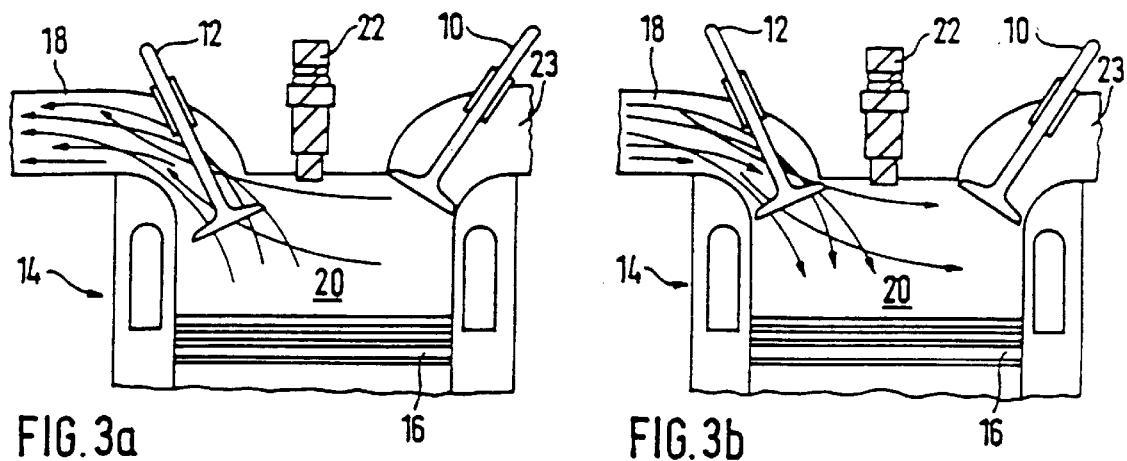
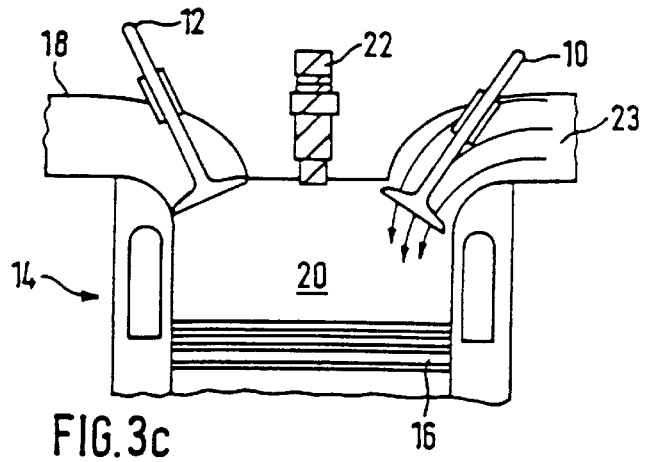

FOUR-STROKE INTERNAL COMBUSTION ENGINE WITH COMPRESSION IGNITION AND INTERNAL EXHAUST GAS RECIRCULATION

FIELD OF THE INVENTION

The invention relates to a four-stroke internal combustion engine with compression ignition and internal exhaust gas recirculation, and to a method for the open-chain and closed-loop control of the engine process of a four-stroke internal combustion engine with compression ignition and internal exhaust gas recirculation.

BACKGROUND

A four-stroke internal combustion engine with compression ignition is known from the publication "The Knocking Syndrome—Its Cure and Its Potential" by J. Willand, SAE Paper 982483. In a homogeneous combustion process described there for the internal combustion engine, parallel energy release by means of compression is achieved by decentralized activation of a charge located in a combustion space, in contrast to previously usual processes in which serial combustion of the charge with a gradually spreading flame front takes place due to central activation by means of an ignition source (spark-ignition process) or by means of injection (diesel process). The decentralized activation provides each charge element with sufficient activation energy to achieve the energy release level.

Particular advantages in the case of homogeneous combustion by means of decentralized activation of the charge follow from the possibility of being essentially able to burn extremely weak mixtures completely, so that the fuel consumption decreases. On the other hand, the combustion of such extremely weak mixtures is associated with low combustion temperatures, which are usually below the limiting temperature for the formation of oxides of nitrogen ($NO_x$), so that the emissions of oxides of nitrogen of such an internal combustion engine are low, at least in the case of low load.

The self-ignition of the charge during the combustion process does, however, demand a certain charge energy and charge temperature level. As described in the publication cited for a four-stroke internal combustion engine, a certain quantity of hot exhaust gas from the previous cycle is retained in the combustion space for mixing with the fresh charge of the current cycle in order to bring the temperature in the combustion space to the necessary activation level. This takes place by appropriate control of the inlet and exhaust valves; in contrast to the usual valve timing, it is proposed that the exhaust valve should be closed earlier and that the inlet valve should be opened later. By this means, a certain quantity of residual exhaust gas can be retained in the combustion space for mixing with the fresh charge and for use in the next cycle. Because the reused residual exhaust gas proportion does not leave the combustion space or the inlet and exhaust ducts, a so-called "exhaust gas retention" is realized in this way.

The type of exhaust gas retention described has the disadvantage that heat transfer takes place between the hot exhaust gas retained in the combustion space and the cylinder wall, which is cold relative to the exhaust gas, and the temperature of the exhaust gas therefore decreases. The desired increase in the temperature of the charge in the combustion space is then insufficient.

In addition, exhaust gas recirculation systems are known in which exhaust gas is returned from the combustion space into an intake duct by means of large valve overlaps, for example by early opening of the inlet valve, and this exhaust gas is sucked back from the intake duct into the combustion space. Because the intake duct is cold relative to the exhaust gas, however, undesirable cooling of the exhaust gas likewise occurs during the insertion and extraction into and from the intake duct. In addition, the suction system is heated by the hot exhaust gas and losses in volumetric efficiency therefore occur.

In contrast, the present invention is based on the object for the creating a four-stroke internal combustion engine with compression ignition and creating a method for the open-chain and closed-loop control of such an internal combustion engine, in which heat losses from the exhaust gas are substantially avoided during the exhaust gas recirculation.

SUMMARY OF THE INVENTION

The four-stroke internal combustion engine with compression ignition and the method for the open-chain and closed-loop control of such a four-stroke internal combustion engine have the advantage that because the exhaust gas is pushed from the combustion space through the open exhaust valve into the exhaust duct, in which the wall temperatures are higher than those of the cylinder wall, the exhaust gas cannot cool so much there and approximately retains its high temperature for the desired increase in the energy level of the charge.

If the charge-exchange top dead center position is defined by a crank angle of 360 degrees, a particularly preferable development of the invention provides for the inlet and exhaust valves to have the following timing: opening of the exhaust valve within a crank angle range between 90 degrees and 180 degrees, preferably at 150 degrees; closing of the exhaust valve and essentially simultaneous opening of the inlet valve within a crank angle range between 450 degrees and 540 degrees, preferably at 470 degrees; and closing of the inlet valve within a crank angle range between 540 and 630 degrees, preferably at 560 degrees.

Preferably, the inlet and exhaust valves are electromagnetic valves which can be actuated by an open-chain and closed loop control device in such a way that, as a function of the parameters of beginning and duration or the center point of the combustion/conversion of the charge during a cycle, which parameters form the control parameters, as setting parameters a certain quantity of exhaust gas can be recirculated into the combustion space and a certain temperature of the recirculated exhaust gas can be achieved in order to determine beginning and duration of the combustion/conversion of the charge for the respectively next cycle. Because of the importance of the quantity and temperature of the exhaust gas recirculated into the combustion space to the beginning and duration of the combustion/conversion of the charge, as part of the combustion process, it is then possible to adjust to particularly low consumption and low-exhaust gas combustion conditions. The variable timing of the inlet and exhaust valves is within the quoted, preferred crank angle ranges. In accordance with a particular embodiment of the invention, it is also possible to configure the inlet and exhaust valves so that they can be actuated electrohydraulically.

Embodiment examples of the invention are represented in the drawings and are explained in more detail in the following description.

BRIEF DESCRIPTION OF DRAWINGS

FIG. 2 shows a diagram in which the piston displacement and the timing of the valves of an internal combustion engine with variable valve timing are shown plotted against the crank angle;

FIG. 3a is a diagrammatic cross-sectional view of a cylinder/piston unit of the internal combustion engine with variable valve timing at a crank angle of approximately 200 degrees;

FIG. 3b shows a diagrammatic cross-sectional view of the cylinder/piston unit at a crank angle of approximately 400 degrees;

FIG. 3c shows a diagrammatic cross-sectional view of the cylinder/piston unit at a crank angle of approximately 500 degrees.

DESCRIPTION OF EMBODIMENTS

Figure 1:
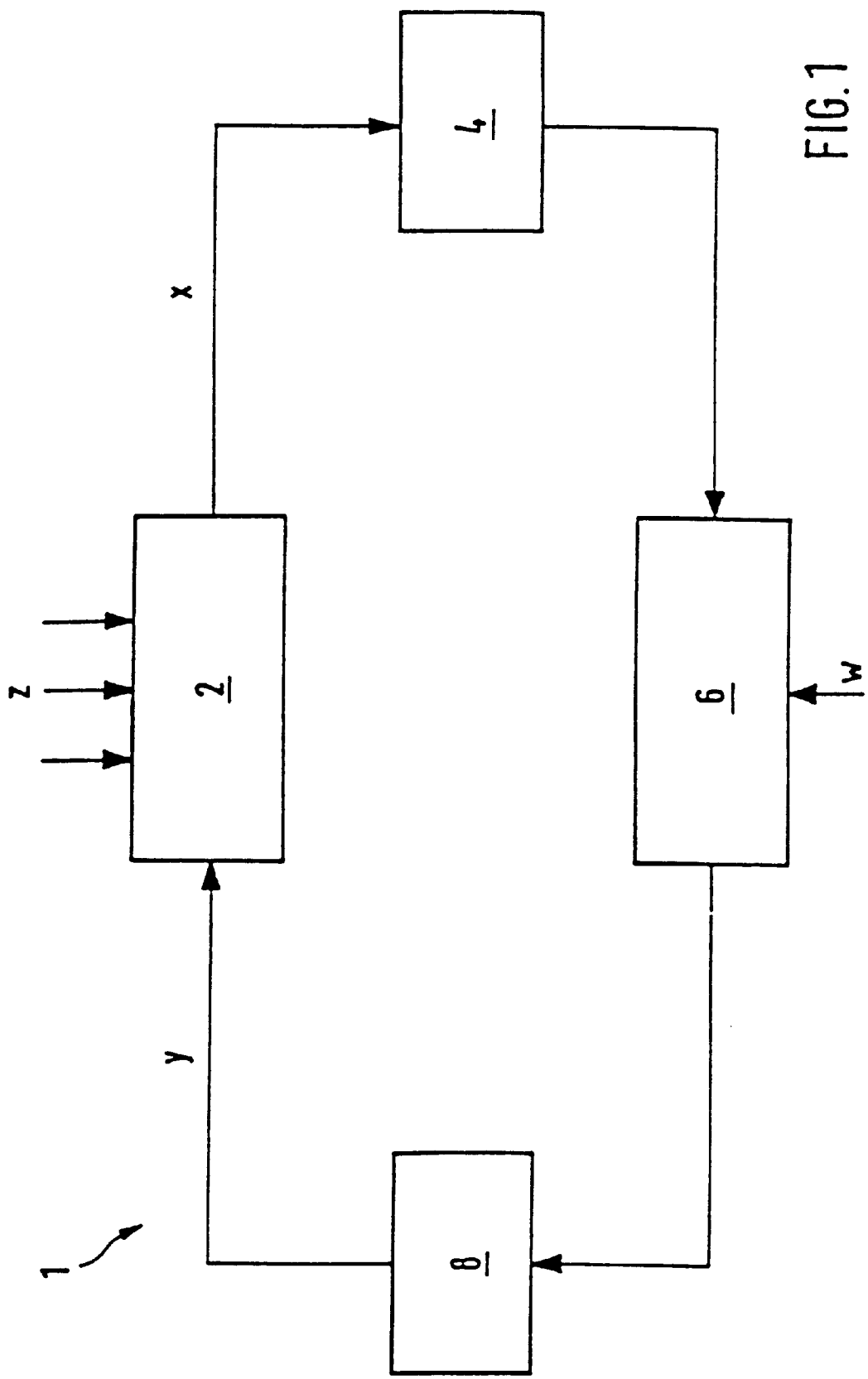
FIG. 1 shows an operational diagram of a control device of an internal combustion engine with compression ignition, in accordance with the invention.

In the embodiment example shown in FIG. 1, the control arrangement, designated overall by 1, of an internal combustion engine 2 with compression ignition and four-stroke cycle is used for controlling the combustion process, in particular for controlling the beginning and the duration of the combustion/conversion or the heat release of a charge, which is formed by an air/fuel mixture and is located in a combustion space of the internal combustion engine 2. By changing the beginning and the duration of the combustion/conversion of the charge, the "condition" of the combustion process can be adapted to the current boundary conditions. In order to optimize it with respect to fuel consumption and exhaust gas emissions, these parameters then preferably representing control parameters x of the open-chain and closed-loop control device 1. The controlled system is formed by the internal combustion engine 2, which is acted on by disturbance values z, for example in the form of changes to the temperature of the induction air or its pressure.

The control parameters x: The beginning and duration of the combustion/conversion of the charge, can be measured by sensors 4, preferably by a combustion space pressure sensor and/or an ionic current sensor, known per se, in order to generate electrical signals, for a control unit 6, for comparing the measured parameters with corresponding control parameters w, which are stored for example in a characteristic diagram memory of the control unit 6. It is, however, also possible to employ an optical conduction measurement technique for the generation of electrical signals, for example to use an optical conduction sensor which can measure the radiation intensity in the combustion space.

As a function of the comparison between the control parameters x and the associated control parameters w control unit 6 generates signals for actuating the control elements 8 for generating control values y. The internal combustion engine 2 comprises a plurality of cylinders with preferably electromagnetic or electrohydraulic inlet and exhaust valves, which form control elements 8 of the open-chain and closed-loop control device 1. The control values y for the inlet and exhaust valves are the valve timings, by means of which the quantity and temperature of the exhaust gas remaining in or recirculated to the combustion space of a cylinder/piston unit can be determined and, in this way, the control parameters x, that is, the beginning and duration of the combustion/conversion, can be influenced.

In FIG. 2 and FIGS. 3a to 3c, a particularly preferable example is shown for control of an electromagnetic inlet valve 10 and an electromagnetic exhaust valve 12 of a cylinder/piston unit 14 of the internal combustion engine 12 in order to realize internal exhaust gas recirculation. In detail, the piston displacement and the valve timing are shown diagrammatically in FIG. 2 as a function of the crank angle. The engine process of the internal combustion engine 2 is preferably a well-known four-stroke process with a suction stroke, a compression stroke, a working stroke and an exhaust stroke. In FIG. 2, starting with a crank angle of zero degrees, the piston 16 is located in a start-of-combustion top dead center position $Z_{TO}$, that is, at the beginning of the working stroke. The self-ignition of the air/fuel mixture takes place within a range between 10 degrees before $Z_{TO}$ and approximately 10 degrees after $Z_{TO}$ (zero degree crank angle). Shortly before the subsequent bottom dead center position of the piston 16 is reached, the exhaust valve 12 opens —designated by AÖ in FIG. 2—within a crank angle range between 150 degrees and 180 degrees, preferably at 165 degrees. During the subsequent exhaust stroke with upwards motion of the piston 16, the exhaust valve 12 remains open so that hot exhaust gas can be displaced into an exhaust duct 18, as is illustrated by the piston position at approximately 200 degrees crank angle, which is represented in FIG. 3a. Instead of the inlet valve 10 opening, as is usual, shortly before the piston reaches a charge exchange top dead center position $LW_{TO}$ at 360 degrees crank angle, the inlet valve remains closed until well into the subsequent suction stroke of the piston so that, instead of fresh air, the exhaust gas, which was previously displaced into the exhaust duct 18 and is still hot, is sucked back into the combustion space 20 by the piston 16 moving toward the bottom dead center position, as is illustrated by position of the piston at approximately 400 degrees crank angle represented in FIG. 3b. At a piston position of approximately 360 degrees crank angle (corresponding to 360 degrees before $Z_{TO}$) at the earliest, fuel can be injected via an injection nozzle 22 directly into the combustion space 20. However, suction pipe injection, which is realized for example during the induction of the fresh air with the inlet valve open, is also possible. Upstream storage of the fuel with the inlet valve still closed is also conceivable. The opening of the inlet valve 10—designated by EÖ in FIG. 2—in order to induce fresh air out of a suction duct 23 during the remaining part of the downward motion of the piston 16, only takes place after the exhaust gas has been sucked back into the combustion space 20, as is illustrated by FIG. 3c at a crank angle of approximately 500 degrees. Essentially, the inlet valve opening EÖ takes place at the same time as the exhaust valve closing as within a crank angle range between 450 and 540 degrees, preferably at 470 degrees. After the bottom dead center position of the piston 16 has been passed, the closing of the inlet valve 10, designated by ES, takes place within a crank angle range between 540 and 630 degrees, preferably at 560 degrees. During the subsequent compression of the air/fuel/exhaust gas mixture brought to a high energy level by the recirculated hot exhaust gases, the self-ignition of this mixture is finally initiated in the region of the ignition top dead center position $Z_{TO}$.

In order to influence the control parameters x, that is, the beginning and duration or center part of the combustion/conversion of the charge in the combustion space 20, electrical signals to the electromagnetic inlet and exhaust valves 10, 12 are provided by the control unit 6 in order to change the crank angle positions at which the exhaust valve closes or the crank angle EÖ at which the inlet valve opens to higher or lower values within the crank angle ranges quoted above. The crank angle difference between exhaust valve opening AÖ and inlet valve closing ES preferably remains essentially constant.

The exhaust valve closing AS and inlet valve opening EÖ take place approximately within the same crank angle range. Ideally, the exhaust valve closing AS and the inlet valve opening EÖ take place at essentially the same time. By center part of the combustion is meant the point in time at which a 50% conversion of the fuel mass injected has taken place.

Although the invention has been described in detail with reference to certain preferred embodiments and specific examples, variations and modification exist within the scope and spirit of the invention as described and as defined in the following claims.

1. A four stroke internal combustion engine with compression ignition comprising a cylinder with a piston disposed in said cylinder so as to be movable between top dead center and bottom dead center end positions, inlet and exhaust passages with inlet and exhaust valves for controlling combustion air flow to, and exhaust gas flow from, said cylinder, said exhaust valve being selectively operable so as to open, during an exhaust stroke, before the top dead center position of said piston and close only after the top dead center position of the piston and said inlet valve being operable so as to open about at the same time as said exhaust valve closes during the intake stroke, for sucking exhaust gas discharged into said exhaust duct during the exhaust stroke from the exhaust duct back into the cylinder at the beginning of the intake stroke and to fill the cylinder with fresh intake air during the remainder of the intake stroke when the exhaust valve is closed and the intake valve is open.

2. The four-stroke internal combustion engine according to claim 1, wherein, with the charge-exchange top dead center position ($LW_{OT}$) being defined by a crank angle of 360 degrees, the inlet and exhaust valves have the following timing:

a) opening of the exhaust valve within a crank angle range between 150 degrees and 180 degrees, preferably at 165 degrees;

b) closing of the exhaust valve and essentially simultaneous opening of the inlet valve within a crank angle range between 450 degrees and 540 degrees, preferably at 470 degrees; and c) closing of the inlet valve within a crank angle range between 540 and 630 degrees, preferably at 560 degrees.

3. The four-stroke internal combustion engine according to claim 2, wherein the inlet and exhaust valves are electromagnetic valves, which can be variably actuated by an open-chain and closed-loop control device.

4. The four-stroke internal combustion engine according to claim 3, wherein an open-chain and closed-loop control device is provided whereby the inlet and exhaust valves can be actuated in such a way that, as a function of the parameters of beginning and duration or center of gravity of the combustion/conversion of the charge during a cycle, which parameters form the control parameters (x), as setting parameters (y), a certain quantity of exhaust gas can be recirculated into the combustion space and a certain temperature of the recirculated exhaust gas can be achieved in order to determine beginning and duration of the combustion/conversion of the charge for the respectively next cycle.

5. A method of controlling a four stroke internal combustion engine with compression ignition, including a cylinder with a piston disposed therein movably between a top dead center position and a bottom dead center position and with inlet and exhaust passages including inlet and exhaust valves for controlling combustion air flow to, and exhaust gas flow from, said cylinder, said method comprising the steps of: opening the exhaust valve for discharging exhaust gas from said cylinder into said exhaust passage during an exhaust stroke before the piston reaches its top dead center position, and selectively closing said exhaust valve after the top dead center position of said piston for sucking exhaust gas from the exhaust passage back into the cylinder at the beginning of an intake stroke while said intake valve is kept closed and, upon closing of said exhaust valve, opening said intake valve to fill the cylinder with fresh intake air during the remainder of the intake stroke of the piston.

6. The method according to claim 5, wherein, with the charge-exchange top dead center position ($LW_{OT}$) defined by a crank angle of 360 degrees, timing of the inlet and exhaust valves is defined as follows:

a) exhaust valve opening (AÖ) within a crank angle range between 150 degrees and 180 degrees;

b) exhaust valve closing (AS) and essentially simultaneous inlet valve opening (EÖ) within a crank angle range between 450 degrees and 540 degrees; and c) inlet valve closing (ES) within a crank angle range between 540 and 630 degrees.

7. The method according to claim 6, wherein the exhaust valve opens at an angle of about 165 degrees, the exhaust valve closes at an angle of about 470 degrees and the inlet valve clses at an angle of about 560 degrees.

8. The method according to claim 6, wherein the inlet and exhaust valves are actuated by the open-chain and closed-loop control device as a function of the parameters of beginning and duration or the center part of the combustion/conversion of the charge during a cycle, which parameters form control parameters as setting parameters for the recirculation of a certain quantity of exhaust gas into the combustion space and for achieving a certain temperature of the recirculated exhaust gas in order to determine the beginning and duration of the combustion/conversion of the charge for the respective next cycle.

* * * * *